United States Patent
Trojer et al.

(10) Patent No.: US 10,707,955 B2
(45) Date of Patent: Jul. 7, 2020

(54) METHODS AND NODES OF A DISTRIBUTED BASE STATION SYSTEM FOR IMPROVED DOWNLINK TRANSMISSION

(71) Applicant: Telefonaktiebolaget LM Ericsson (publ), Stockholm (SE)

(72) Inventors: Elmar Trojer, Täby (SE); Miguel Berg, Sollentuna (SE); Peter De Bruin, Gammelstad (SE); Bo Hagerman, Tyresö (SE); Johan Söder, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,340

(22) PCT Filed: Nov. 27, 2015

(86) PCT No.: PCT/SE2015/051274
§ 371 (c)(1),
(2) Date: Apr. 18, 2018

(87) PCT Pub. No.: WO2017/091117
PCT Pub. Date: Jun. 1, 2017

(65) Prior Publication Data
US 2018/0309510 A1  Oct. 25, 2018

(51) Int. Cl.
*H04W 28/18* (2009.01)
*H04W 72/04* (2009.01)
(Continued)

(52) U.S. Cl.
CPC ........ *H04B 7/2606* (2013.01); *H04W 28/065* (2013.01); *H04W 28/16* (2013.01);
(Continued)

(58) Field of Classification Search
USPC ......................................................... 370/254
See application file for complete search history.

(56) References Cited

U.S. PATENT DOCUMENTS

| | | | | |
|---|---|---|---|---|
| 2011/0032935 A1* | 2/2011 | Yang | ....................... | H04L 47/10 370/389 |
| 2014/0269859 A1* | 9/2014 | Hanson | ................... | H04B 7/024 375/219 |

(Continued)

FOREIGN PATENT DOCUMENTS

| | | |
|---|---|---|
| EP | 1713290 A1 | 10/2006 |
| WO | 2014202124 A1 | 12/2014 |

OTHER PUBLICATIONS

International Search Report and Written Opinion for International Application No. PCT/SE2015/051274, dated Aug. 2, 2016, 13 pages.
(Continued)

*Primary Examiner* — Asad M Nawaz
*Assistant Examiner* — Jason A Harley
(74) *Attorney, Agent, or Firm* — NDWE LLP

(57) ABSTRACT

A method performed by an intermediate unit of a distributed base station system of a wireless communication network. The distributed base station system has a first base unit and a second base unit connected to the intermediate unit. The intermediate unit is further connected to a first remote unit, which is further connected for distributing wireless signals to pieces of User Equipment (UEs). The intermediate unit receives, from the first base unit, first data and sends the first data over a point-to-point connection to the first remote unit for further distribution wirelessly over a radio channel to the UEs. In response to the reception of the first data, a first indication is sent to the second base unit that the radio channel is free. The second base unit can send second data (Continued)

that is then to be sent from the remote unit towards the UEs on the radio channel.

21 Claims, 9 Drawing Sheets

(51) Int. Cl.
    *H04L 9/32*     (2006.01)
    *H04W 88/08*     (2009.01)
    *H04W 28/02*     (2009.01)
    *H04B 7/26*     (2006.01)
    *H04W 74/08*     (2009.01)
    *H04W 28/16*     (2009.01)
    *H04W 28/06*     (2009.01)
    *H04W 84/12*     (2009.01)

(52) U.S. Cl.
    CPC ..... *H04W 74/0808* (2013.01); *H04W 88/085* (2013.01); *H04W 84/12* (2013.01)

(56) References Cited

U.S. PATENT DOCUMENTS

2016/0227578 A1*   8/2016   Lee ..................... H04W 74/004
2017/0149543 A1*   5/2017   Ang ..................... H04L 5/0007

OTHER PUBLICATIONS

"Discussion on Necessity of the Study on RAN Virtualization," Jun. 10-13, 2014, 4 pages, 3GPP TSG RAN #64 Meeting, RP-140705, Sophia Antipolis, France.
"Potential Enhancements for Target Scenarios of RAN Enhancements for UMTS/HSPA and LTE Interworking," Apr. 15-19, 2013, 5 pages, 3GPP TSG RAN WG3 #79bis, R3-130604, Chicago, USA.
Decision to grant a European patent pursuant to Article 97(1) EPC for EP Application No. 15813620.0, dated May 31, 2019, 2 pages.
Communication under Rule 71(3) EPC for EP Application No. 15813620.0, dated Apr. 17, 2019, 96 pages.
Communication under Rule 71(3) EPC for EP Application No. 15813620.0, dated Mar. 20, 2019, 96 pages.
International Preliminary Report on Patentability for International Application No. PCT/SE2015/051274, dated Jun. 7, 2018, 10 pages.

* cited by examiner

METHODS AND NODES OF A DISTRIBUTED BASE STATION SYSTEM FOR IMPROVED DOWNLINK TRANSMISSION

CROSS-REFERENCE TO RELATED APPLICATIONS

This application is a National stage of International Application No. PCT/SE2015/051274, filed Nov. 27, 2015, which is hereby incorporated by reference.

TECHNICAL FIELD

The present disclosure relates generally to methods, intermediate nodes and remote nodes of a distributed base station system for improved downlink transmission.

BACKGROUND

There are today different concepts for distributing base station functionality onto different nodes into a so called distributed base station system. Basic purposes for distributing base station functionality are to improve radio coverage and to increase throughput to pieces of User Equipment, UEs. Base station functionality is typically distributed onto one or more base units, one or more intermediate units and a plurality of remote units. Typically, the remote unit has little functionality and can be made cheap and small, and the more intelligent functionality of a base station is moved up in the system. Thereby, it may be cost-efficient for an operator to have many remote units close to the antenna with a small geographical coverage area each, and to connect the remote units via e.g. a cable to an intermediate unit. Further, a distributed base station may be cost-efficient as the base units, which are processing-heavy are centralized and can therefore share electrical power, cooling systems, processors etc. Also, to centralize base stations allows for co-ordination of traffic, e.g. mobility management, over a large coverage area.

One type of distributed base station is a regular base station connected to a distributed antenna system, DAS. In a DAS, a plurality of remote antennas are physically connected to an intermediate controller which in its turn is connected to a base station. The base station may, except for communicating with UEs via the intermediate controller and the antennas, also have its own antennas serving UEs directly. In an active DAS, the nodes, i.e. intermediate controller and/or remote antennas contain means for amplifying the signal, and in some cases also for translating the signal to a different frequency. The active DAS is commonly used for different kinds of radio deployments such as indoor enterprise environments, shopping malls, airports, railway stations, arenas and even for outdoor light pole micro cell deployments. The active DAS supports multi-operator operation, base stations from different vendors, multi-band operation and multi-access operation. The active DAS can also be deployed over fiber or over copper cable, e.g. twisted pair; CAT5, 6 or 7 or coaxial cable.

FIG. 1 shows an active DAS 15 according to prior art. The active DAS comprises an intermediate controller, also called a head-end unit 30 connected to one or more remote units 20. One or more base stations 40, 50 are typically connected to the head-end 30, which may be a common head-end, with analog radio frequency interfaces, the antenna interface. A DAS vendor interface may be used for communication to the remote unit 20. The interface is potentially proprietary. The remote unit 20 is either connected towards local antennas 10 which might be integrated into the unit or, as more common, to a passive DAS portion comprising a tree-coax cabling network for a local distribution of passive DAS antennas. The remote unit 20 can contain several RF modules, typically one module per frequency band, and per operator and possibly per radio frequency band, feeding the analog RF carrier signals to the local antennas or the passive DAS portion for further wireless distribution to UEs 40. For the interface 25 between the head-end 30 and the remote unit 20, optical fiber or CAT cabling can be used. The radio carriers are transported over the interface 25 either by analog sub-carrier multiplexing or by digital packet transmission. Such cabling limits however the available capacity between head-end and remote unit and digital signal processing is typically used to configure the carriers/sectors into the interface. The head-end and remote unit are often equipped with specific hardware both for the radio carrier frequency(ies) and for the cable type used.

Another type of distributed base station is called a remote radio head system RRHS. The RRHS can be described as spatially separated transceivers connected to a radio unit via corresponding antenna ports. The RRHS is in one perspective a complete radio base station with split architecture, but can also be seen as a type of active DAS, possibly with integrated antenna in the remote unit. The RRHS enables operators to utilize e.g. LAN cables like CAT6/7 for indoor radio deployments. This system improves over older distributed antenna systems by providing streamlined installation procedures, low cost, energy efficiency and higher capacity due to native support of MIMO and multi-band. The RRHS 55 is a distributed base station system wherein the base station functionality is separated in different nodes, which are shown in FIG. 2. A baseband unit, BBU 60, in which signal treatment in the baseband frequency area is performed, is connected to an intermediate radio unit, IRU 70, which is arranged to receive (in the downlink direction) the baseband signals from one or more BBUs, convert them to an intermediate frequency and distribute the signals over a dedicated cable 75 to a destined radio head, RH 80. There may be a plurality of RHs connected via dedicated cables to the IRU. The RH 80 then up-converts the received intermediate frequency signal to a radio frequency for radio transmission from an antenna 90 of the RH towards UEs 40 being in radio connection with the RH. The IRU 70 does not have an analog radio interface towards the BBU, like the typical active DAS has towards the base station. Instead an electrical, or optical, CPRI interface is used to connect to the BBU, which saves hardware both in the base station and in the IRU. Another difference, compared to the typical active DAS, is that the proprietary interface over cable 75 is analog intermediate frequency IF rather than digital.

The CPRI is not yet standardized on all protocol levels but may be in the future. Alternatively, other optical/digital interfaces may be standardized. This would enable multi-vendor digital connection between BBUs/base stations and the IRU/head end. An analog, e.g. RF, interface between the BBU/base station and the IRU/head end would similarly enable multi-vendor and multi-operator services.

The main objective with multi-operator solutions is to share infrastructure, in terms of cabling, radios, etc. Depending on solution, more or less equipment can be shared. The most common solution today is passive DAS, where only passive infrastructure is shared, i.e. cables, splitters, antennas, especially multi-band antennas, and then the active radio equipment is specific per operator. Several methods for multi-operator solutions have been discussed, involving both licensed and un-licensed spectrum, for example (the list is not conclusive): Operators using separate, e.g. own or licensed, spectrum within the same frequency band; Operators using separate e.g. own or licensed, spectrum within different frequency bands; Operators using combined e.g. own or licensed, spectrum within the same frequency band; Operators using separate e.g. own or licensed, spectrum within the same frequency band, in combination with shared unlicensed spectrum, called License Assisted Access, LAA; Operators using shared, licensed or unlicensed, spectrum within one or multiple frequency bands.

License Assisted Access, LAA. 3GPP standardization work has started to support aggregation of licensed and unlicensed spectrum with LTE. A licensed carrier is used as anchor for mobility and control information, and an unlicensed carrier is used for increasing capacity and peak rates through carrier aggregation. In an indoor multi-operator scenario the indoor system must support at least one licensed carrier for each operator, but this carrier may be of a very low bandwidth, LTE supports carriers as narrow as 1.4 MHz or possibly even narrower, if aggregation with one or several unlicensed carriers is possible. The unlicensed carriers may be shared dynamically between the operators depending on capacity demands and/or contractual agreements Service Level Agreements, SLAs.

Since the RRHS is today really an eNodeB, multi-operator sharing in the sense that operators share the active equipment to transmit on their respective licensed carriers is not possible in today's RRHS. However, it is expected that the interface between the BBU and the IRU will be evolved such that it can enable multi-operator support. In the multi-operator case, there is often a need to support indoor coverage for all operators. When deploying many operators and carriers with sufficient radio coverage, the potential air-interface capacity is often superfluous. The cable, used between the IRU/head-end and the radio head/remote unit, has a limited bandwidth which can be the bottle neck for supporting several operators if each operator needs a dedicated carrier.

SUMMARY

It is an object of the invention to address at least some of the problems and issues outlined above. It is an object of embodiments of the invention to use a point-to-point connection between an intermediate unit and a remote unit of a distributed base station system in an efficient way. It is possible to achieve these objects and others by using a method and an apparatus as defined in the attached independent claims.

According to one aspect, a method is provided performed by an intermediate unit of a distributed base station system of a wireless communication network, for efficient downlink transmission. The distributed base station system comprises a first base unit and a second base unit, each base unit being connected to the intermediate unit. The intermediate unit is further connected via a point-to-point connection to a first remote unit of the base station system, which first remote unit is connected to a at least one antenna for distributing wireless signals to UEs. The method comprises receiving, from the first base unit, first data that is to be sent from the remote unit towards the UEs on a first radio channel of an unlicensed frequency band, sending the first data over the point-to-point connection to the first remote unit for further distribution wirelessly over the first radio channel to the UEs, in response to the reception of the first data, and sending, to the second base unit, a first indication that the first radio channel is free. The method further comprises receiving, from the second base unit, second data that is to be sent from the remote unit towards the UEs on the first radio channel of the unlicensed frequency band, the second data being received in response to the sending of the first indication, and sending the second data over the point-to-point connection to the first remote unit for further distribution wirelessly over the first radio channel to the UEs, in response to the reception of the second data.

According to another aspect, a method is provided performed by a remote unit of a distributed base station system of a wireless communication network, for efficient downlink transmission. The base station system comprises a first base unit and a second base unit, each base unit being connected to an intermediate unit of the base station system. The intermediate unit is connected via a point-to-point connection to the remote unit, and the remote unit is connected to a at least one antenna for distributing wireless signals to UEs. The method comprises receiving, from the intermediate unit over the point-to-point connection, a first data originating from the first base unit, sending the first data over a first radio channel to the UEs, in response to the reception of the first data, receiving, from the intermediate unit over the point-to-point connection, a second data originating from the second base unit, and sending the second data over the first radio channel to the UEs, in response to the reception of the second data.

According to another aspect, an intermediate unit is provided, operable in a distributed base station system of a wireless communication network. The distributed base station system comprises a first base unit and a second base unit, each base unit being connected to the intermediate unit. The intermediate unit is further connected via a point-to-point connection to a first remote unit of the base station system, which first remote unit is connected to a at least one antenna for distributing wireless signals to UEs. The intermediate unit comprises a processor and a memory. The memory contains instructions executable by said processor, whereby the intermediate unit is operative for receiving, from the first base unit, first data that is to be sent from the remote unit towards the UEs on a first radio channel of an unlicensed frequency band, sending the first data over the point-to-point connection to the first remote unit for further distribution wirelessly over the first radio channel to the UEs, in response to the reception of the first data, and sending, to the second base unit, a first indication that the first radio channel is free. The intermediate unit is further operative for receiving, from the second base unit, second data that is to be sent from the remote unit towards the UEs on the first radio channel of the unlicensed frequency band, the second data being received in response to the sending of the first indication, and sending the second data over the point-to-point connection to the first remote unit for further distribution wirelessly over the first radio channel to the UEs, in response to the reception of the second data.

According to another aspect, a remote unit is provided, operable in a distributed base station system of a wireless communication network. The base station system comprises a first base unit and a second base unit, each base unit being connected to an intermediate unit of the base station system. The intermediate unit is connected via a point-to-point connection to the remote unit, and the remote unit is connected to a at least one antenna for distributing wireless signals to UEs. The remote unit comprises a processor and a memory. The memory contains instructions executable by said processor, whereby the remote unit is operative for receiving, from the intermediate unit over the point-to-point connection, a first data originating from the first base unit, sending the first data over a first radio channel to the UEs, in response to the reception of the first data, receiving, from the intermediate unit over the point-to-point connection, a second data originating from the second base unit, and sending the second data over the first radio channel to the UEs, in response to the reception of the second data.

According to other aspects, computer programs and carriers are also provided, the details of which will be described in the claims and the detailed description. The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to improve usage of a point-to-point wireless or wireline connection between an intermediate unit and a remote unit of a distributed base station system having a plurality of base units, BU connected to the intermediate unit. The base units may belong to different operators and/or be arranged for different radio technologies. The base units are arranged to transmit data via the intermediate unit and the remote unit for further wireless transmission from the remote unit to UEs. The data transmitted by the base units are then transmitted over the shared point-to-point connection between the intermediate unit and the remote unit. As a result, the shared point-to-point connection can become a bottleneck for the transmission from the BUs to the UEs. Especially, since a distributed base station system today transmits a copy of a single radio band on the shared point to point connection (today a cable) as it would appear over the air, unused RF bandwidth in this band is also unused on the cable frequency spectrum. This means those spectral gaps reduce the efficiency on the shared point-to-point connection and inhibit multi-operator and multi-band deployments.

This is solved according to embodiments of the invention by sending first data originating from a first base unit from the intermediate unit over the shared point-to-point connection to the remote unit for further wireless transmission by the remote unit over a first channel of an unlicensed frequency band. The intermediate unit then informs the second base unit when the first channel is vacant, and as a response the second base unit sends data to the intermediate unit which sends the received data further over the shared point-to-point connection to the remote unit for further transmission over the first channel of the unlicensed frequency band. As a result, data originating from two different BUs, which data is to be transmitted wirelessly over the same radio channel from the remote unit, is sent at different time points over the shared point-to-point connection. Consequently, the limited capacity of the shared point-to-point connection is saved, since the data that anyhow has to be transmitted at different time points over the radio channel is sent at different time points over the shared point-to-point connection. In a way, this method could be seen as a way of using the listen before talk mechanism that is used for sending data over the same radio channel also for sending data over the shared point-to-point connection.

Figure 3:
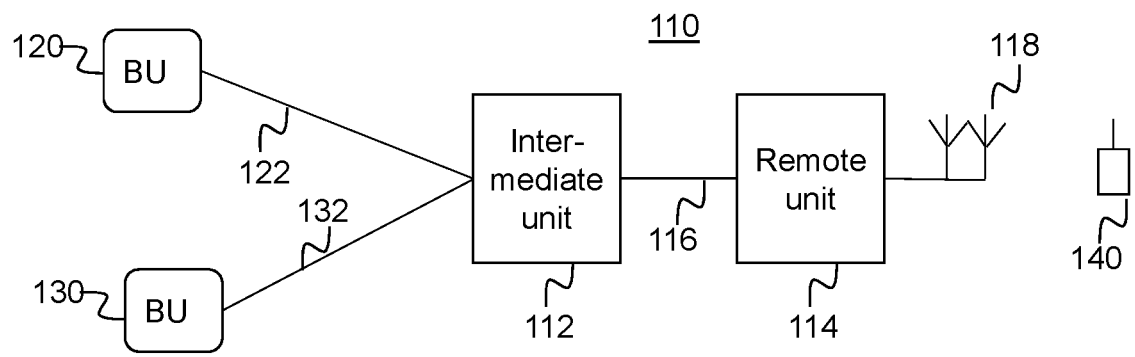
FIG. 3 is a block diagram of a distributed base station system in which the present invention may be used.

FIG. 3 shows a distributed base station system 110 of a wireless communication network. The distributed base station system 110 comprises a first base unit 120 and a second base unit 130, an intermediate unit 112 and a first remote unit 114. The first base unit 120 is connected to the intermediate unit 112 via a first base unit connection 122, which may be a wireless or a wireline connection. The second base unit 130 is connected to the intermediate unit 112 via a second base unit connection 132, which may be a wireless or a wireline connection. The first base unit connection may be separate from the second base unit connection. The intermediate unit 112 is further connected via a wireline connection or a wireless point-to-point connection 116 to the first remote unit 114. The first remote unit 114 is further connected to a at least one antenna 118, in FIG. 3 exemplified by two antennas, for distributing wireless signals to pieces of User Equipment, UEs 140.

Figure 4:
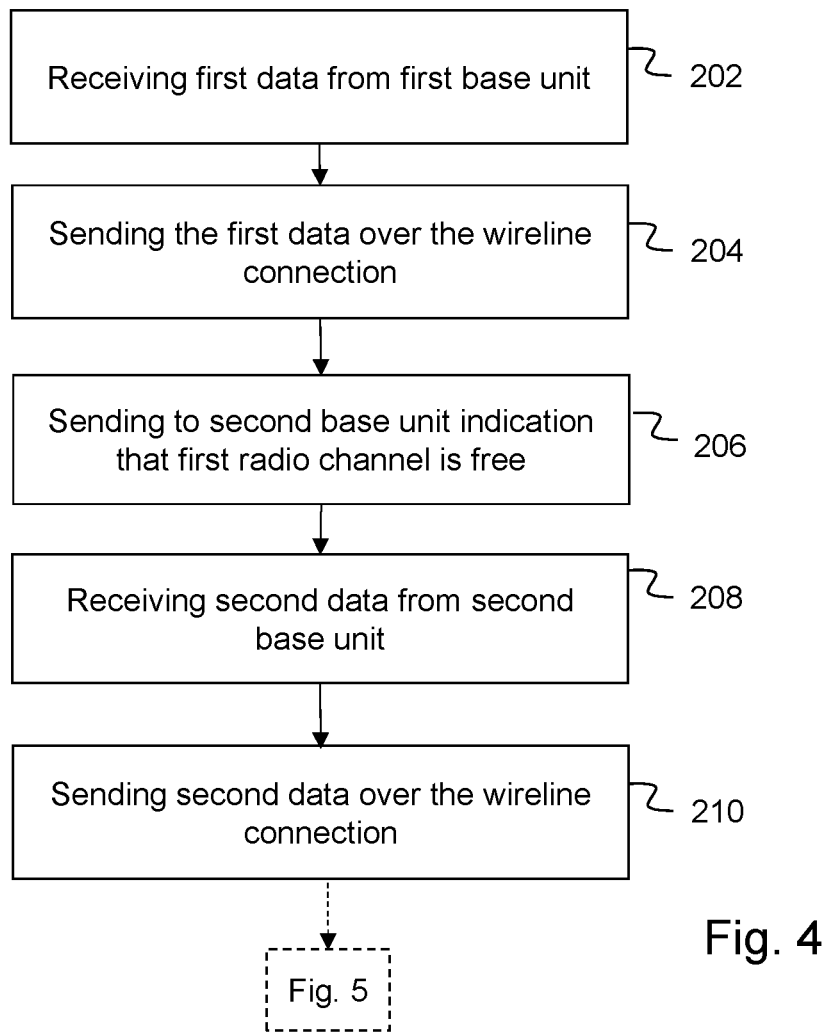
FIGS. 4-7 are flow charts describing methods performed by an intermediate unit according to possible embodiments.

A method of the invention is shown in FIG. 4, in conjunction with the already presented distributed base station system of FIG. 3. The method is performed by the intermediate unit 112 of the distributed base station system 110 and is performed for efficient downlink transmission. The distributed base station system 110 comprises the first base unit 120 and the second base unit 130, each base unit being connected to the intermediate unit 112. The intermediate unit is further connected via a point-to-point connection 116 to the first remote unit 114, which first remote unit is connected to the at least one antenna 118 for distributing wireless signals to UEs 140. The method comprises receiving 202, from the first base unit, first data that is to be sent from the remote unit towards the UEs on a first radio channel, and sending 204 the first data over the point-to-point connection 116 to the first remote unit 114 for further distribution wirelessly over the first radio channel to the UEs, in response to the reception of the first data. The method further comprises sending 206, to the second base unit, a first indication that the first radio channel is free. The method further comprises receiving 208, from the second base unit, second data that is to be sent from the remote unit towards the UEs on the first radio channel, the second data being received in response to the sending 206 of the first indication, and sending 210 the second data over the point-to-point connection 116 to the first remote unit 114 for further distribution wirelessly over the first radio channel to the UEs, in response to the reception of the second data.

The distributed base station system may be a distributed antenna system, DAS. In a DAS, the base units may be base stations and the intermediate unit may be called a head-end unit. In another type of distributed base station system, an RRHS, in which the present invention may be used, the base unit may be called a baseband unit, and the remote unit may be called a radio head.

The point-to-point connection between the intermediate unit and the remote unit may be a wireline connection or a wireless connection. The wireline connection may be an optical fiber or a metallic conductor. The wireless point-to-point connection between the intermediate unit and the remote unit may be microwave, millimeter wave, or free-space optics, FSO, or any type of short range radio point-to-point connection such as short-range cable replacement technology as exemplified by a technology described in IEEE 802.11 lay. The point-to-point connection can also be a path/tunnel through a bridged/routed packet network, such as Ethernet packet flows through a switched network. The first/second data received by the intermediate unit from the first/second base unit is data that is to be sent on one or more radio channels when the first/second data, after having been sent further from the intermediate unit to the remote unit, is sent wirelessly from the remote unit to the UEs. The received first/second data can be seen as a digital or analog representation of the first/second data as sent wirelessly over the unlicensed frequency band from the remote unit towards the UEs. The data sent from the base units to the intermediate units may be sent on the Common Public Radio Interface, CPRI. The data that is sent from the base units via the intermediate units to the remote units may be digital samples that represent a radio signal that will be used in the radio channel of the unlicensed frequency band.

The first and the second base unit may share the same intermediate unit and the same remote unit. The first and the second base unit may use different antennas connected to the remote unit, for distributing its wireless signals to the UEs, or they may share antenna(s). The intermediate unit should indicate to the first and second base units that the first channel is free. For a given base unit, this may mean that the air channel on the relevant antenna is free, e.g. any existing RF signal on the channel is below a threshold, and/or that the shared point-to-point connection between the intermediate unit and the remote unit is not busy. Further, if e.g. the second base unit has data to send, and the radio channel is indicated to be free, the second base unit may use a collision avoidance method, e.g. wait a random back off time, and then start transmitting. The first channel may be a channel of an unlicensed frequency band. Such a method is especially advantageous in an unlicensed frequency band since the unlicensed band is shared and the channels of the band can be taken by anyone.

The first base unit may belong to a first operator and the second base unit may belong to a second operator, different from the first operator. The first and the second base units may share the same physical hardware or be two physically different nodes. The first and the second base unit may be virtualized on the same hardware. The first data and the second data may be sent over the point-to-point connection 116 over a same frequency band of the point-to-point connection. "A radio channel", in e.g. "the first radio channel" can be a single radio carrier, but also a bunch of carriers.

By providing an indication to the second base unit that the first wireless channel is free, it is possible to use a listen before talk mechanism, as is used downlink at the wireless interface between the remote unit and the UEs, also for the connection 116 between the intermediate unit and the remote unit. This means that the first and the second data that are to be sent wirelessly from the remote unit to the UEs over the same radio channel at separate time points are also sent over the connection 116 at separate time points. As a result, many base units, e.g. belonging to different operators, may share the same intermediate unit 112 and the same connection 116 with a much lower risk of the connection 116 becoming a bottleneck.

According to an embodiment, the sending 206 of the first indication that the first radio channel is free is triggered by a reception of an indication from the remote unit that the first radio channel is free. Then the second base unit would know that there is no more first data sent over the first radio channel, and also no other data from any other any other radio transmitter occupying the same first radio channel, for example a Wireless Local Area Network, WLAN, access point or station. The second base unit then also knows that the connection 116 would be free from any first data that is to be sent on the first radio channel and knows that it can send its own second data over to the intermediate unit for further transmission.

However, it may happen that another access point has taken over the first radio channel in the time duration from sending of the indication from the remote unit and to the second data is received at the remote unit. For this reason, and according to another embodiment, the sending 206 of the first indication that the first radio channel is free is triggered by a detection that the first data is not sent on the point-to-point connection 116 anymore. Such an indication would be a quicker indication of free radio channel than the above indication, and the risk of any other radio transmitter, such as a WLAN access point, having taken the first radio channel in the time gap from sending of the first data and sending of the second data over the first radio channel would be lower.

The first indication that the first data is not sent anymore on the point-to-point connection 116 may be an indication that, for example, all first data have been sent or the transmission of first data have been interrupted. In other words, the first indication may be an indication that the connection 116 is not used for sending any data that is to be sent on the first channel of the unlicensed frequency band, by the remote unit. That no first data is sent anymore may be detected in different ways. E.g. when using an analog interface, the ports on the intermediate unit connecting to a base unit could have a receiver power detector checking if a signal is received from the base unit the respective port is connected to. If a signal from a base unit is received at the intermediate unit port, a status line back to all other base units flip from free to busy, or vice versa. In a digital interface, a digital receiver power detector at each receiver port at the intermediate unit can detect free/busy and signal back to the base units by means of a digital flag in the CPRI control protocol, or separate control message.

The indication may not be sent until both it has been detected that the first data is not sent on the point-to-point connection 116 anymore and the indication has been received from the remote unit that the radio channel is free. This would provide a more foolproof detection that both the connection 116 and the first radio channel is free. Further, it may be pointed out that a free channel signifies a vacant channel.

Figure 5:
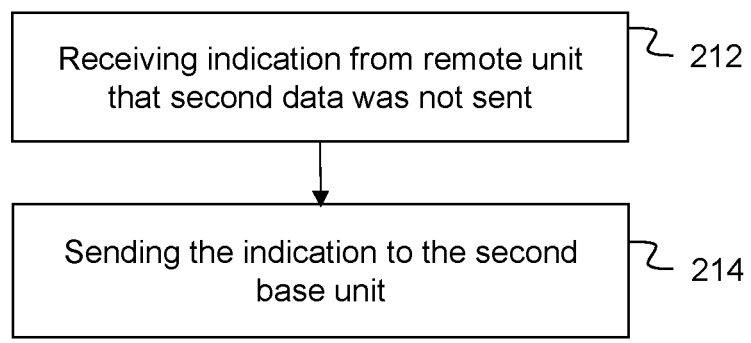

According to another embodiment, which is described in FIG. 5, the method further comprises receiving 212 a second indication from the first remote unit 114 that the second data was not sent from the first remote unit towards the UEs, and sending 214 the received second indication to the second base unit. That the second data was not sent may signify that not all data was sent.

It may happen that the first channel has been taken by another downlink sending node after the first data has been sent from the remote node towards the UEs and before the second base unit had time to send the data from the remote node towards the UEs. In that case the second base unit is informed of the unsuccessful sending so that the second base unit can reschedule the transmission of the second data.

Figure 6:
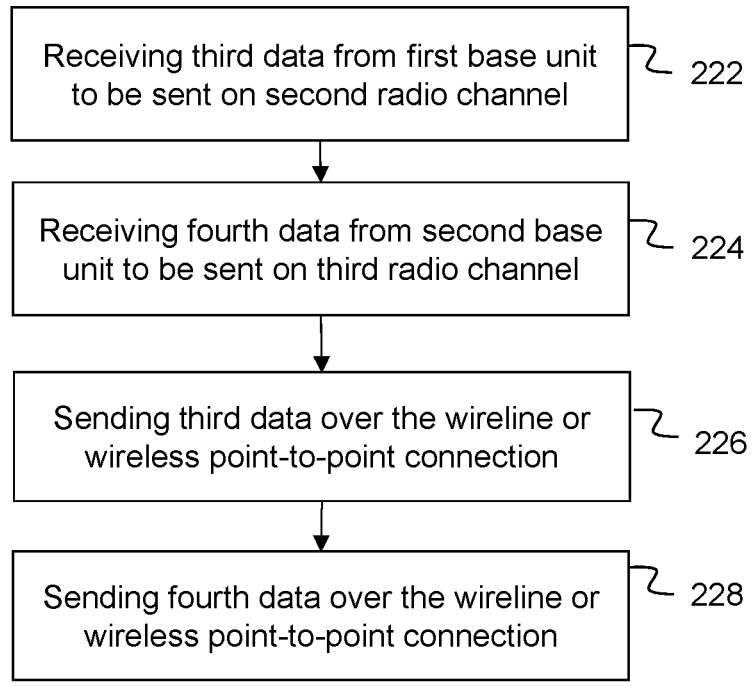

According to another embodiment, which is described in FIG. 6, the method further comprises receiving 222, from the first base unit 120, third data that is to be sent from the remote unit towards the UEs on a second radio channel of a first licensed frequency band, and receiving 224, from the second base unit 130, fourth data that is to be sent from the remote unit towards the UEs on a third radio channel of a second licensed frequency band. The method may further comprise sending 226, in response to the reception of the third data, the third data over the point-to-point connection 116 on a second frequency band or packet stream different from a first frequency band or packet stream on which the first data and the second data is sent, and sending 228, in response to the reception of the fourth data, the fourth data over the point-to-point connection 116 on a third frequency band or packet stream different from the first frequency band or packet stream and different from the second frequency band or packet stream. By such a measure, data that is to be sent wirelessly on a different channel than the first radio channel can be sent over the connection 116 simultaneously as the first data is sent, without using the same part of the transmission capacity of the connection 116 as the first data.

Figure 7:
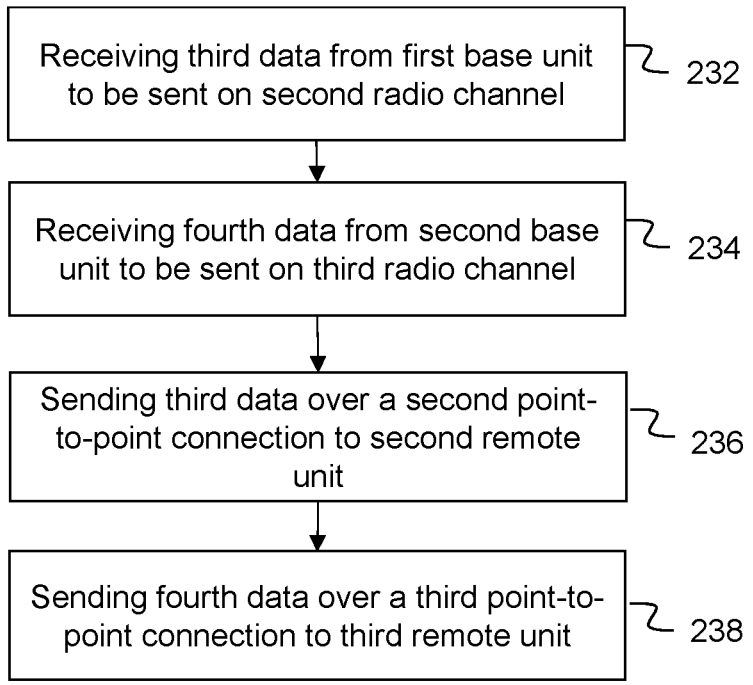

Another embodiment is described in FIG. 7. This embodiment makes it possible to have a different remote unit and different point-to-point connection for different channels. This may be especially advantageous for information on licensed frequency bands that have to be transmitted to UEs simultaneous as first data sent on an unlicensed frequency band. According to this embodiment, the method further comprises receiving 232, from the first base unit, third data that is to be sent from a second remote unit towards the UEs on a second radio channel of a first licensed frequency band, and receiving 234, from the second base unit, fourth data that is to be sent from a third remote unit towards the UEs on a third radio channel of a second licensed frequency band. The method may further comprise sending 236, in response to the reception of the third data, the third data over a second point-to-point connection towards the second remote unit connected to the second point-to-point connection, and sending 238, in response to the reception of the fourth data, the fourth data over a third point-to-point connection towards the third remote unit connected to the third point-to-point connection.

According to another embodiment, the method further comprises sending a third indication to the second base unit that the point-to-point connection 116 is occupied, in response to the receiving of the first data from the first base unit. The intermediate unit may also indicate to the second base unit, when starting receiving the first data, that the connection 116 is occupied so that the second base unit knows that it cannot send any data now.

Figure 8:
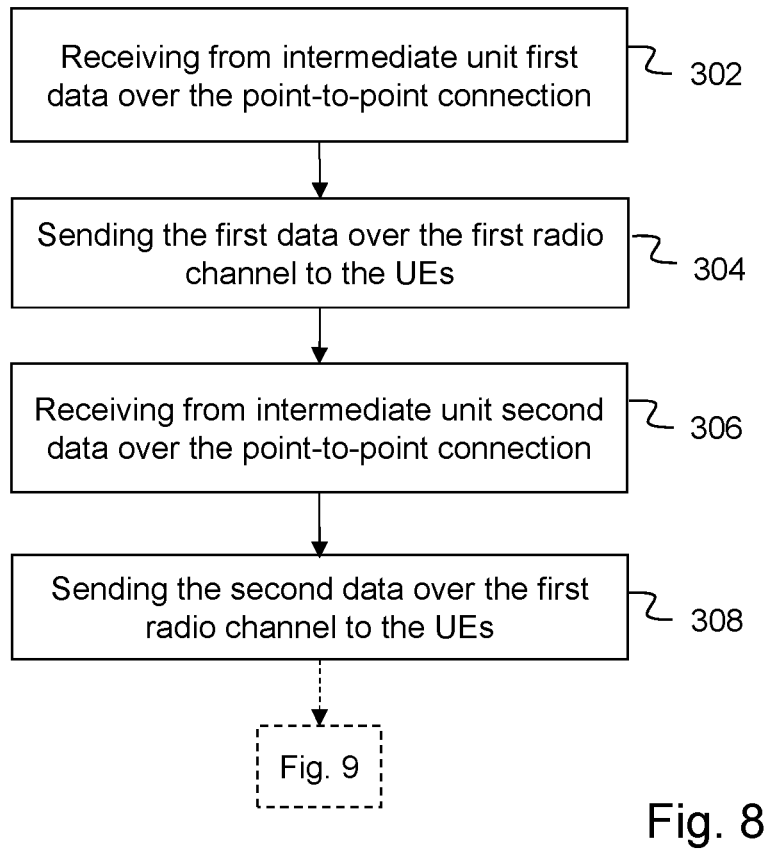
FIGS. 8-10 are flow charts describing methods performed by a remote unit according to possible embodiments.

FIG. 8, in conjunction with FIG. 3, describes a method performed by a remote unit 114 of a distributed base station system 110 of a wireless communication network, for efficient downlink transmission. The base station system comprises a first base unit 120 and a second base unit 130, each base unit being connected to an intermediate unit 112 of the base station system, the intermediate unit being connected via a wireline connection or a wireless point-to-point connection 116 to the remote unit, and the remote unit is connected to a at least one antenna 118 for distributing wireless signals to pieces of User Equipment, UEs 140. The method comprises receiving 302, from the intermediate unit 112 over the point-to-point connection 116, a first data originating from the first base unit, sending 304 the first data over a first radio channel to the UEs, in response to the reception 302 of the first data. The method further comprises receiving 306, from the intermediate unit 112 over the point-to-point connection 116, a second data originating from the second base unit, and sending 308 the second data over the first radio channel to the UEs, in response to the reception 306 of the second data.

According to an embodiment, the method further comprises detecting that the first radio channel is free, and sending, to the intermediate unit, an indication that the first radio channel is free, in response to the detection that the first radio channel is free. The remote unit may for example detect that the first data has been sent towards the UEs and that the first radio channel is vacant again. It may then send the indication to the intermediate unit so that the intermediate unit can inform, e.g. the second base unit, and possibly also the first base unit, that the first radio channel is free to use again.

Figure 9:
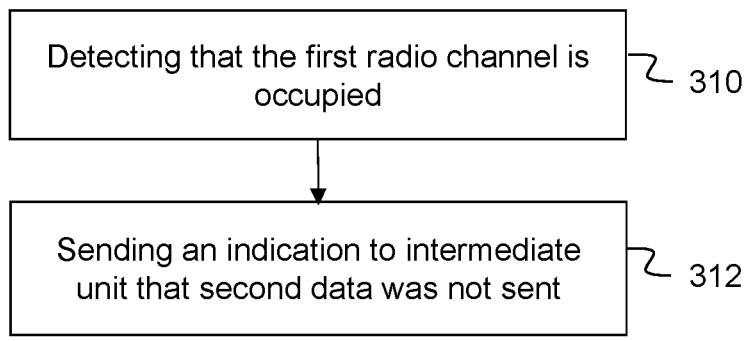

According to another embodiment, which is described in FIG. 9, the method further comprises detecting 310 that the first radio channel is occupied when trying to send 308 the second data to the UEs, and sending 312 an indication to the intermediate unit that the second data was not sent from the remote unit towards the UEs. The remote unit may indicate that the first radio channel was taken by another radio unit, e.g. another base unit or a WLAN access point. In this way the second base unit would get to know that it has to send the second data once again later. The remote unit may also disable its wireless transmitter when detecting that the first radio channel is occupied by another radio unit.

Figure 10:
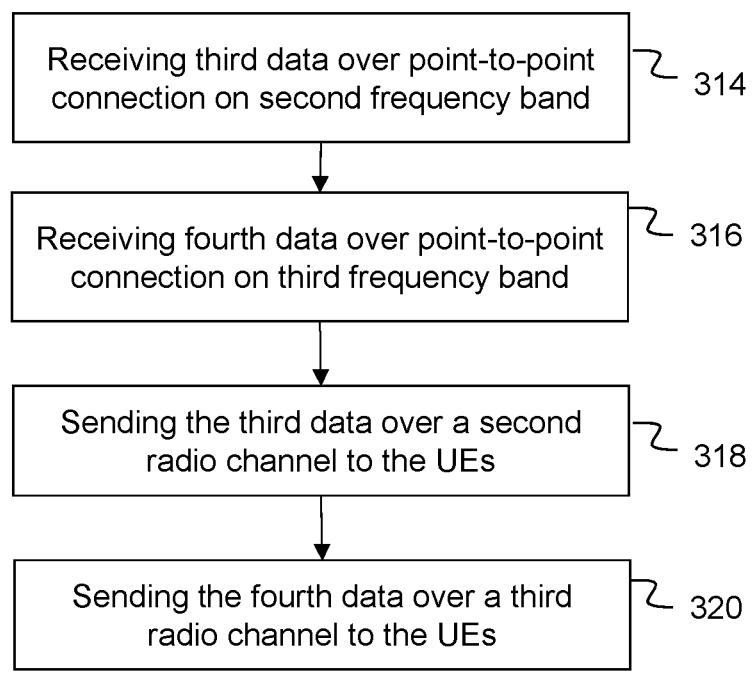

According to another embodiment, which is shown in FIG. 10, the method further comprises receiving 314, from the intermediate unit, third data over the point-to-point connection 116 on a second frequency band or packet stream different from a first frequency band or packet stream on which the first data and the second data is sent, the third data originating from the first base unit, and receiving 316, from the intermediate unit, fourth data over the point-to-point connection on a third frequency band or packet stream different from the first conductor frequency band or packet stream, the fourth data originating from the second base unit. The method further comprises sending 318 the third data over a second radio channel of a licensed frequency band towards the UEs, and sending 320 the fourth data over a third radio channel of a licensed frequency band towards the UEs.

Embodiments of the invention allow several operators to operate in Licensed Assisted Access, LAA, mode on the same cable and the same remote unit by applying a listen-before-talk, LBT, medium access scheme used in the air interface between remote unit and UEs also to the point-to-point interface between the intermediate unit and the remote unit. As only a single operator is allowed to transmit on the unlicensed shared channel at a given time, according to the LBT scheme, the signals from different BUs (e.g. from different operators) appear time-multiplexed on the point-to-point interface providing a time-sharing mechanism. In LAA, the transmission of secondary carrier(s), i.e. supplementary downlinks, on channels e.g. in an unlicensed band, is restricted to time instances where no other stations are transmitting. A listen-before-talk protocol that contains clear channel assessment, CCA, in receive operation to qualify a free channel and on/off data cycling is applied. As the delay on the point-to-point interface, e.g. cable, introduces protocol inefficiencies between BUs, a local transmit signal loopback is introduced to shorten the time until a free channel is detected. The primary carriers, a.k.a. anchors that operate in the individual operators licensed bands are stacked close-by on e.g. the cable's intermediate frequency, IF. Those typically smaller-band primary carriers (smaller compared to the secondary carriers), provide broadcast/reference control signaling and data-plan signaling to support reliable mobility, voice, etc.

In another embodiment, the primary carriers can be also be transmitted on their own infrastructure i.e. own point-to-point connections from the intermediary unit to different remote units.

Figure 11:
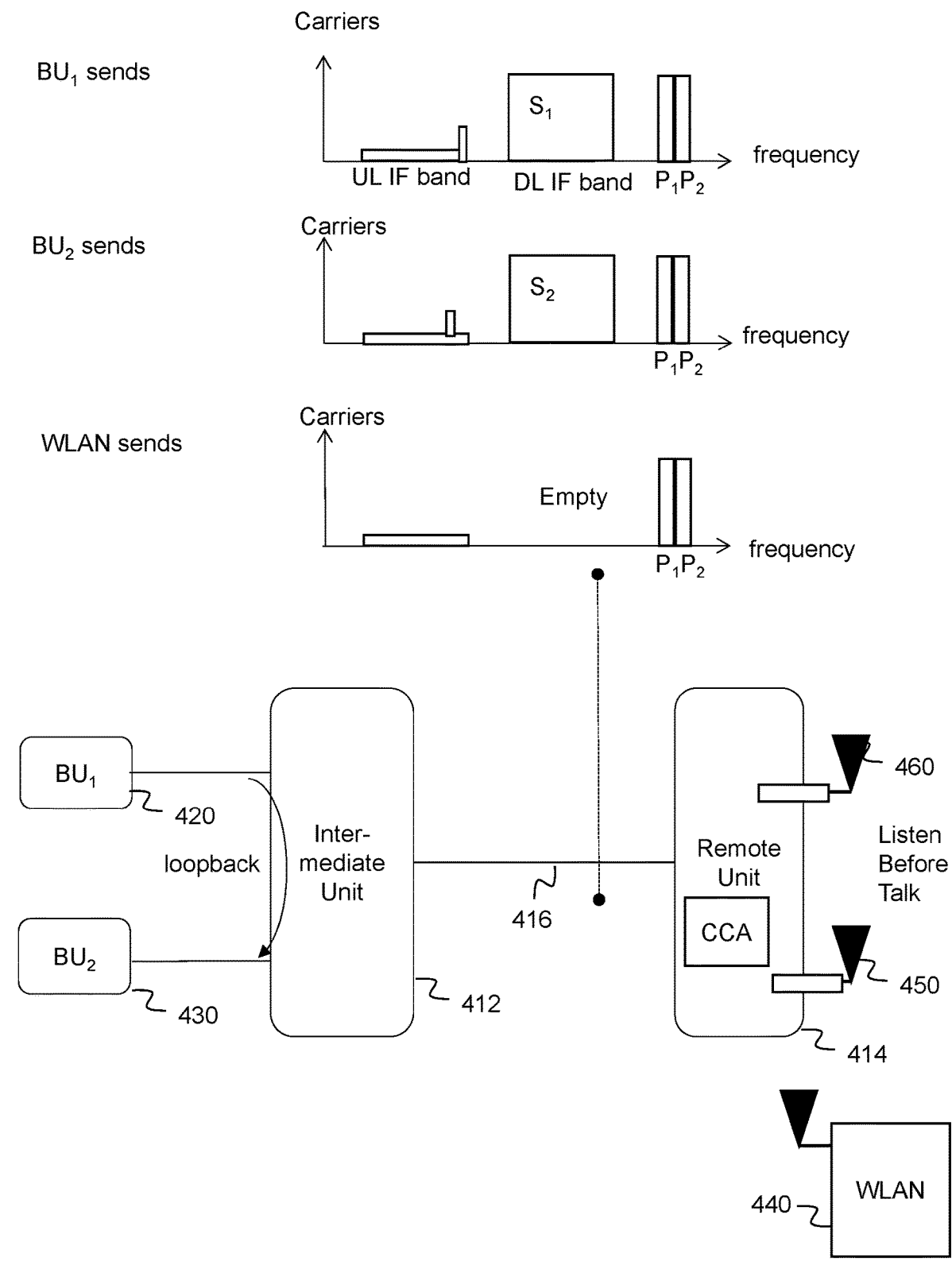
FIG. 11 is a block diagram with associated x/y diagrams illustrating sending of data on primary and secondary carriers according to possible embodiments.

FIG. 11 shows an LAA multi-BU network architecture and medium access timing on the point-to-point connection 416 between the intermediate unit 412 and the remote unit 414. The point-to-point connection 416 is in this example a CAT cable. Further, FIG. 11 shows as an example two base units, $BU_1$ 420 $BU_2$ 430, (more than two BUs may of course be used). The two BUs 420, 430 may be operated by different operators. Each BU runs LAA with a primary carrier and a secondary carrier (more than one primary and secondary carrier may of course be used). In this example BU1 runs primary carrier P1 and secondary carrier S1 and BU2 runs primary carrier P2 and secondary carrier S2. Primary carriers may be in a licensed frequency band whereas secondary carriers are in an unlicensed frequency band. Note that S1 and S2 can be individual carriers or a group of carrier-aggregated carriers (e.g. Nx20 MHz). Further in FIG. 11 there is a WLAN access point 440 that also may transmit using the same secondary carriers S1, S2. S1 and S2 may be seen as different carriers because they carry different data. However, they use the same channel in that they use the same carrier frequency in the same unlicensed frequency band. Further, above the part of FIG. 11 with the BUs, the intermediate unit and the remote unit there are three x-y diagrams illustrating what is transmitted over the cable 416 at three different time points, respectively, at time point $t_1$ when BU1 420 sends, at $t_2$ when BU2 430 sends and at $t_3$ when the WLAN access point 440 sends.

The secondary radio carriers S1, S2 co-exist in the same unlicensed band when they are transmitted wirelessly from antennas 450, 460 of the remote unit and are therefore sent time multiplexed over the air according to LBT. S1 and S2 are therefore also time multiplexed on the CAT cable 416 according to the LBT medium access. In the FIG. 11 example, BU1 has gained channel access at time point t1 (top diagram in FIG. 11). The S1 carrier(s) are then transmitted on downlink IF on the cable while other stations, i.e. BU2, are only checking a free/busy indication from the intermediate unit to assess the channel occupancy. If now S1 is done, BU2 could grab the channel at t2 after some random waiting time and use the same downlink IF spectrum on the CAT cable for sending S2. This allows for time-sharing in the IF-band or to time share the link capacity by means of digital data packets. Lastly, if e.g. the WLAN access point 440 transmits, all operator base stations are quiet and only listen.

In more detail of FIG. 11, the uppermost diagram shows that when BU1 has access to the unlicensed band used for S1 and S2, the UL IF band of the cable is used for listening, for both BU1 and BU2, the DL IF band is used by BU1 for transmitting S1, and a higher part of the IF frequency band of the cable is used for transmitting the primary carrier of BU1, i.e. P1 and the primary carrier of BU2, i.e. P2. At a later time point or time period t2, shown in the middle diagram, BU2 has access to the unlicensed band used for S1 and S2. Then the UL IF band of the cable is still used for listening, for both BU1 and BU2, the DL IF band is used by BU2 for transmitting S2, and the higher part of the IF frequency band of the cable is still used for transmitting P1 and P2. At a later time point t3, shown in the lowermost diagram, the WLAN access point 440 has gain access to the unlicensed DL band. This means that no data is sent in the DL IF band of the cable ("empty" in FIG. 11). P1 and P2 are still sent and the UL IF band is still used for listening. Further, in the UL IF band, also a CCA indication may be sent to the intermediate unit over the cable.

Figure 12:
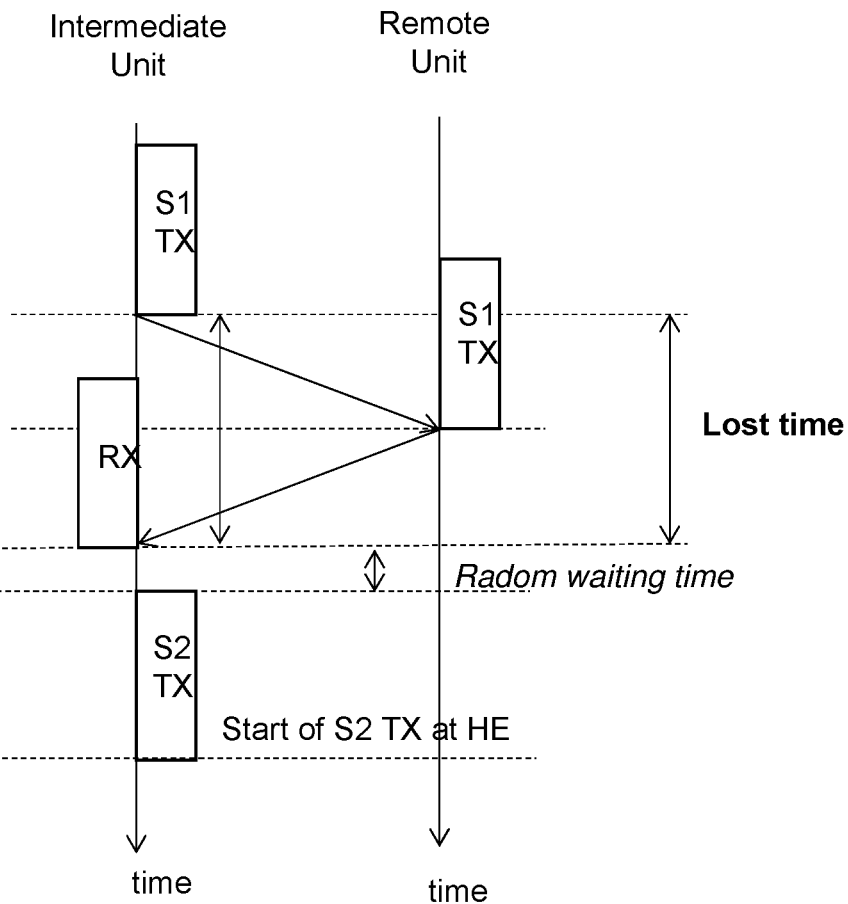
FIG. 12 is a diagram illustrating delays for informing of a free channel over the point-to-point connection between remote unit and intermediate unit.

As the delay through the cable will make the listening base-stations react later, if an indication is received from the remote unit that the unlicensed carrier is free, the LBT is not efficient, and there is a risk that someone else takes the unlicensed carrier, e.g. the WLAN access point. Therefore, a local signal feedback is installed at the intermediate unit or directly between BUs. The local signal feedback informs the second BU that the first BU is not sending over the CAT cable anymore, or that the there is no data received at the intermediate unit from the first BU anymore. The local signal that is feedback can either be a digital signal indicating channel utilization as output from a power detector, or a low-power tapped version of the original TX signals. FIG. 12 details the delay problem. In the example shown in FIG. 12, with reference to FIG. 11, S1 is transmitted from the intermediate unit 412 to the remote unit 414 via the DL IF band of the CAT cable 416. As the cable introduces delay, S1 is radiated from one of the antennas 450, 460 of the remote unit 414 with the cable's one-way delay. On the other hand, the waiting BU2 430 senses the end of S1 TX signal with an additional cable delay at its individual receiver or by CCA indication from the intermediate unit. By detecting the end of S1 by a cable round trip delay too late, this time period is lost for transmission for other base-stations and the throughput is reduced. Even worse, WLAN APs operating at the remote unit location and wanting to use the same unlicensed spectrum have an advantage in detecting the clear channel condition earlier and claiming it. The solution is to spread the TX signals at the intermediate unit to all base-stations receivers to indicate correct timing. Further in FIG. 12, the random waiting time used in LBT is indicated, which is the time a sender has to wait before being allowed to wait after it has received an indication that the channel is free.

As shown in FIG. 11, the primary carriers P1, P2 may be stacked by the intermediate unit 412 on the CAT cable within a portion of the IF frequency band not used by the secondary carriers S1, S2. The carriers are not shared and have their own IF frequency (FDD or TDD). The remote unit 414 extracts the individual primary carriers P1, P2, and places them into the operators licensed radio bands. Further, the remote unit 414 has a switch functionality at its interface to the antennas 450, 460 (indicated by the boxes at the interface between antennas 450, 460 and remote unit 414 in FIG. 11). The switch functionality makes it possible for the remote unit to open a transmitter switch to disable transmission if its CCA-unit detects that WLAN has taken the unlicensed channel. The CCA unit also uses the UL IF band to indicate busy back to the intermediate unit (indicated by the small upstanding blocks in the Carriers/frequency t1, t2 diagrams).

Figure 13:
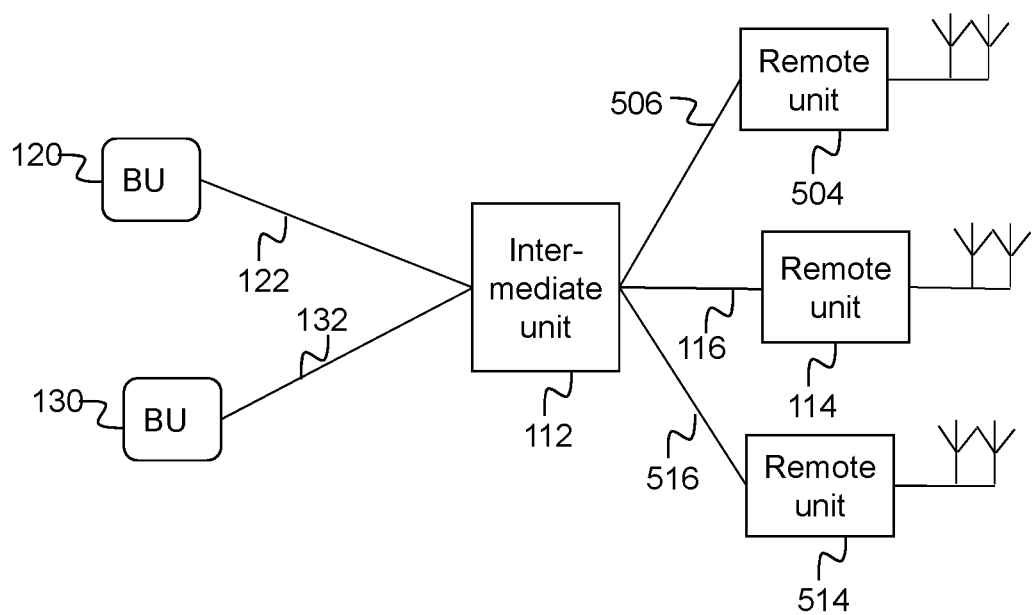
FIG. 13 is a block diagram of an alternative distributed base station system in which embodiments of the present invention may be used.
Figure 14:
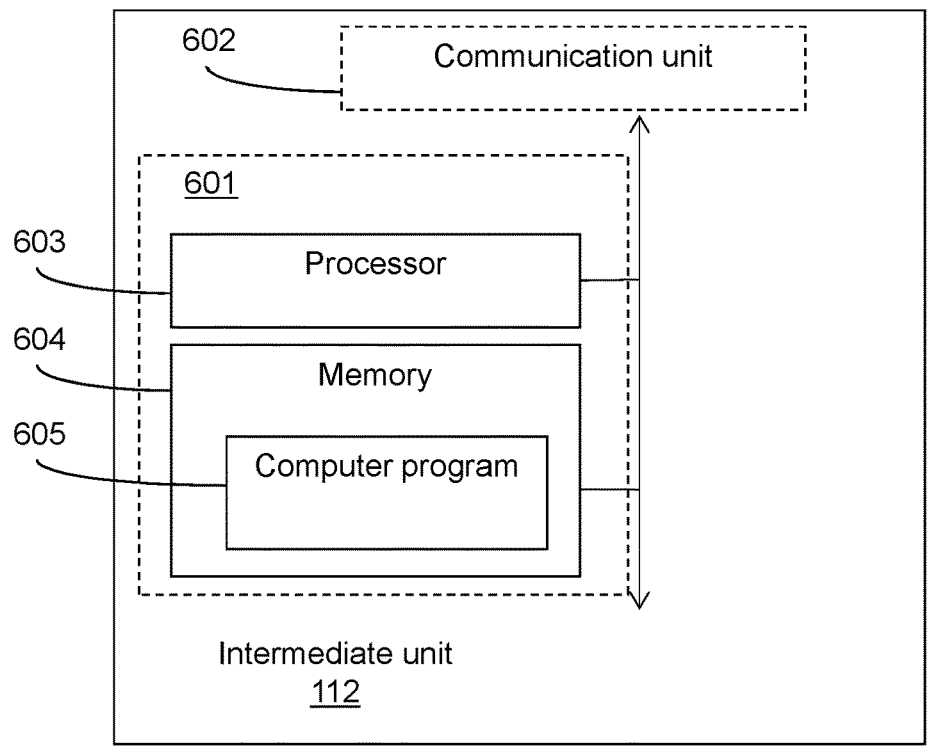
FIGS. 14-15 are block diagrams illustrating an intermediate unit in more detail, according to further possible embodiments.

In another embodiment, as shown in FIG. 13, the primary carriers P1, P2 can also be transmitted wirelessly by separate remote units 504, 514 that are separate from the remote unit 114 transmitting the secondary carriers. Here unlicensed band operation over the secondary carriers over a shared CAT cable and remote unit may be accomplished the same way as shown in FIG. 11. Licensed operation on primary carriers, on the other hand, are routed over individual CAT cables 506, 516 to individual intermediate units 504, 514, respectively. Consequently, the primary carriers will be guaranteed transmission capacity between intermediate unit and remote unit thanks to the dedicated primary carrier cable. FIG. 14, in connection with FIG. 1 describes an intermediate unit 112 operable in a distributed base station system 110 of a wireless communication network, the distributed base station system 110 comprising a first base unit 120 and a second base unit 130, each base unit being connected to the intermediate unit 112. The intermediate unit is further connected via a point-to-point connection 116 to a first remote unit 114 of the base station system, which first remote unit is connected to a at least one antenna 118 for distributing wireless signals to pieces of UEs 140. The intermediate unit 112 comprises a processor 603 and a memory 604. The memory contains instructions executable by said processor, whereby the intermediate unit 112 is operative for receiving, from the first base unit, first data that is to be sent from the remote unit towards the UEs on a first radio channel of an unlicensed frequency band, sending the first data over the point-to-point connection 116 to the first remote unit 114 for further distribution wirelessly over the first radio channel to the UEs, in response to the reception of the first data, and sending, to the second base unit, a first indication that the first radio channel is free. The intermediate unit is further operative for receiving, from the second base unit, second data that is to be sent from the remote unit towards the UEs on the first radio channel of the unlicensed frequency band, the second data being received in response to the sending of the first indication, and sending the second data over the point-to-point connection 116 to the first remote unit 114 for further distribution wirelessly over the first radio channel to the UEs, in response to the reception of the second data.

According to an embodiment, the intermediate unit 112 is further operative to trigger the sending of the first indication that the first radio channel is free is by a reception of an indication from the remote unit that the first radio channel is free.

According to another embodiment, the intermediate unit 112 is further operative to trigger the sending of the first indication that the first radio channel is free by a detection that the first data is not sent on the point-to-point connection anymore.

According to another embodiment, the intermediate unit 112 is further operative for receiving a second indication from the first remote unit 114 that the second data was not sent from the first remote unit towards the UEs, and sending the received second indication to the second base unit.

According to another embodiment, the intermediate unit 112 is further operative for receiving, from the first base unit 120, third data that is to be sent from the remote unit towards the UEs on a second radio channel of a first licensed frequency band, and for receiving, from the second base unit (130), fourth data that is to be sent from the remote unit towards the UEs on a third radio channel of a second licensed frequency band. The intermediate unit is further operative for sending, in response to the reception of the third data, the third data over the point-to-point connection (116) on a second frequency band or packet stream different from a first frequency band or packet stream on which the first data and the second data is sent, and for sending, in response to the reception of the fourth data, the fourth data over the point-to-point connection (116) on a third frequency band or packet stream different from the first frequency band or packet stream and different from the second frequency band or packet stream.

According to another embodiment, the intermediate unit 112 is further operative for receiving, from the first base unit, third data that is to be sent from a second remote unit towards the UEs on a second radio channel of a first licensed frequency band, and for receiving, from the second base unit, fourth data that is to be sent from a third remote unit towards the UEs on a third radio channel of a second licensed frequency band. The intermediate unit 112 is further operative for sending, in response to the reception of the third data, the third data over a second point-to-point connection towards the second remote unit connected to the second point-to-point connection, and sending, in response to the reception of the fourth data, the fourth data over a third point-to-point connection towards the third remote unit connected to the third point-to-point connection.

According to another embodiment, the intermediate unit 112 is further operative for sending a third indication to the second base unit that the point-to-point connection 116 is occupied, in response to the receiving of the first data from the first base unit.

According to other embodiments, the intermediate unit 112 may further comprise a communication unit 602, which may be considered to comprise conventional means for communicating from and/or to other nodes in the distributed base station, such as the first and second BUs, the remote unit etc. The communication unit 602 may comprise one or more communication ports for communicating with the other nodes. The instructions executable by said processor 603 may be arranged as a computer program 605 stored in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above.

Figure 1:
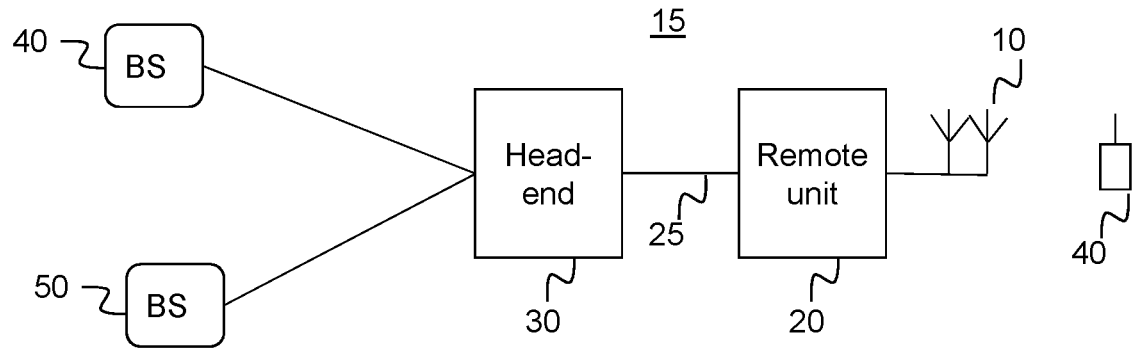
FIG. 1 is a block diagram of a DAS according to prior art.
Figure 2:
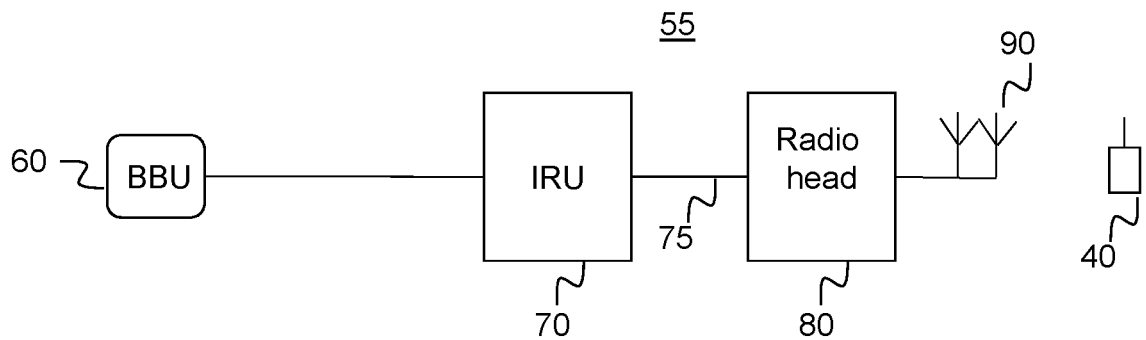
FIG. 2 is a block diagram of an RRHS according to prior art.
Figure 15:
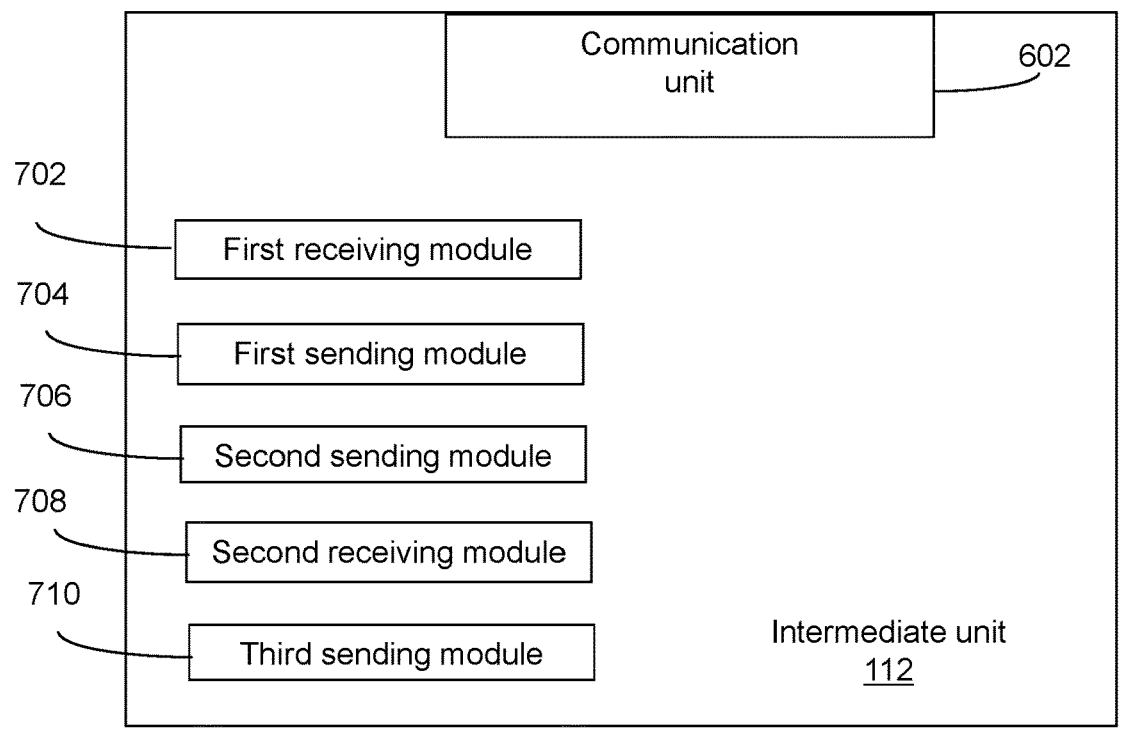

FIG. 15, in conjunction with FIG. 1, shows another embodiment of an intermediate unit 112 operable in a distributed base station system 110 of a wireless communication network, the distributed base station system 110 comprising a first base unit 120 and a second base unit 130, each base unit being connected to the intermediate unit 112. The intermediate unit is further connected via a point-to-point connection 116 to a first remote unit 114 of the base station system, which first remote unit is connected to a at least one antenna 118 for distributing wireless signals to pieces of UEs 140. The intermediate unit 112 comprises a first receiving module 702 for receiving, from the first base unit, first data that is to be sent from the remote unit towards the UEs on a first radio channel of an unlicensed frequency band, a first sending module 704 for sending the first data over the point-to-point connection 116 to the first remote unit 114 for further distribution wirelessly over the first radio channel to the UEs, in response to the reception of the first data, and a second sending module 706 for sending, to the second base unit, a first indication that the first radio channel is free. The intermediate unit 112 further comprises a second receiving module 708 for receiving, from the second base unit, second data that is to be sent from the remote unit towards the UEs on the first radio channel of the unlicensed frequency band, the second data being received in response to the sending of the first indication, and a third sending module 710 for sending the second data over the point-to-point connection 116 to the first remote unit 114 for further distribution wirelessly over the first radio channel to the UEs, in response to the reception of the second data.

Figure 16:
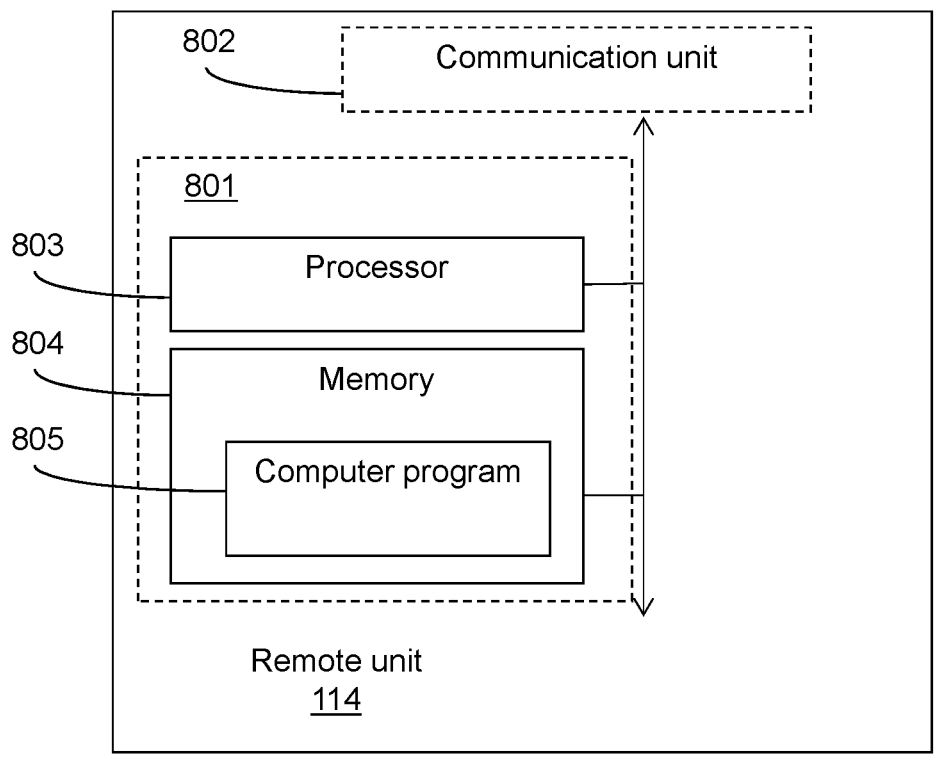
FIGS. 16-17 are block diagrams illustrating a remote unit in more detail, according to further possible embodiments.

FIG. 16, in conjunction with FIG. 1, shows a remote unit 114 operable in a distributed base station system 110 of a wireless communication network, for efficient downlink transmission, the base station system comprising a first base unit 120 and a second base unit 130, each base unit being connected to an intermediate unit 112 of the base station system. The intermediate unit is connected via a point-to-point connection 116 to the remote unit, and the remote unit is connected to a at least one antenna for distributing wireless signals to UEs. The remote unit 114 comprises a processor 803 and a memory 804. The memory contains instructions executable by said processor, whereby the remote unit 114 is operative for receiving, from the intermediate unit 112 over the point-to-point connection 116, a first data originating from the first base unit, sending the first data over a first radio channel to the UEs, in response to the reception of the first data, receiving, from the intermediate unit 112 over the point-to-point connection 116, a second data originating from the second base unit, and sending the second data over the first radio channel to the UEs, in response to the reception of the second data.

According to an embodiment, the remote unit 114 is further operative for detecting that the first radio channel is free, and sending to the intermediate unit, an indication that the first radio channel is free, in response to the detection that the first radio channel is free.

According to other embodiments, the remote unit 114 may further comprise a communication unit 802, which may be considered to comprise conventional means for communicating from and/or to other nodes in the distributed base station, such as the intermediate unit, and to UEs. The communication unit 802 may comprise one or more communication ports for communicating with the other nodes, i.e. the intermediate unit. The communication unit 802 may comprise one or more transceivers for transmitting and receiving wireless signals from/to UEs. The instructions executable by said processor 803 may be arranged as a computer program 805 stored in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

Figure 17:
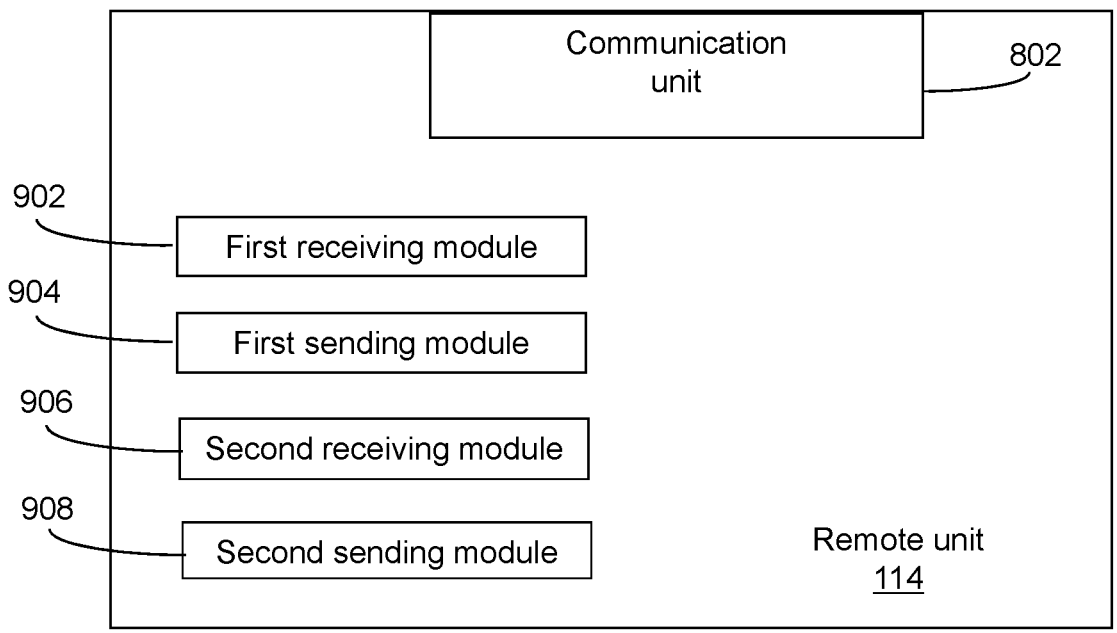

FIG. 17, in conjunction with FIG. 1 shows another embodiment of a remote unit 114 operable in a distributed base station system 110 of a wireless communication network, for efficient downlink transmission, the base station system comprising a first base unit 120 and a second base unit 130 each base unit being connected to an intermediate unit 112 of the base station system. The intermediate unit is connected via a point-to-point connection 116 to the remote unit, and the remote unit is connected to a at least one antenna for distributing wireless signals to UEs. The remote unit 114 comprises a first receiving module 902 for receiving, from the intermediate unit 112 over the point-to-point connection 116, a first data originating from the first base unit, a first sending module 904 for sending the first data over a first radio channel to the UEs, in response to the reception of the first data, a second receiving module 906 for receiving, from the intermediate unit 112 over the point-to-point connection 116, a second data originating from the second base unit, and a second sending module 908 for sending the second data over the first radio channel to the UEs, in response to the reception of the second data.

The computer programs 605 and 805 may respectively comprise computer readable code means, which when run in the intermediate unit 112/the remote unit 114 causes the intermediate unit/the remote unit to perform the steps described in any of the described embodiments of the respective intermediate unit/remote unit. The respective computer programs 605; 805 may be carried by a computer program product connectable to the processor 603; 803. The computer program product may be the memory 604; 804. The memory 604; 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604; 804. Alternatively, the computer program may be stored on a server or any other entity connected to the communication network to which the intermediate unit/remote unit has access via its communication unit 602; 802. The computer program may then be downloaded from the server into the memory 604; 804.

As indicated above, embodiments of the invention are based on an idea of using the Listen Before Talk mechanism that is used over the air between network nodes and UEs, e.g. between the remote unit and the UEs, also over the point-to-point connection between the intermediate unit and the remote unit. This is especially useful when the point-to-point connection is shared by a plurality of (at least virtually) different base units, which may be used by different operators. In some of the embodiments above, the base station system would allow sending of data from the BUs towards the UEs when the point-to-point connection as well as the radio channel shared over the air interface between remote unit and UE is vacant. Further, embodiments of the invention are especially useful when the radio channel is shared is in an unlicensed frequency band.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by an intermediate device of a distributed base station system of a wireless communication network, for downlink transmission, the distributed base station system comprising a first base station device and a second base station device, each base station device being connected to the intermediate device, the intermediate device being further connected via a point-to-point connection to a first remote radio device of the distributed base station system, which first remote radio device is connected to at least one antenna for distributing wireless signals to a plurality of User Equipment (UEs), the method comprising:

receiving, from the first base station device, first data that is to be sent from the first remote radio device towards the UEs on a first radio channel of an unlicensed frequency band;

sending, at a first time point, the first data over the point-to-point connection to the first remote radio device for further distribution wirelessly over the first radio channel to the UEs, in response to receiving the first data;

sending, to the second base station device, a first indication that the first radio channel is free;

receiving, from the second base station device, second data that is to be sent from the first remote radio device towards the UEs on the first radio channel of the unlicensed frequency band, the second data being received in response to the sending of the first indication;

sending, at a second time point which is separate from the first time point, the second data over the point-to-point connection to the first remote radio device for further distribution wirelessly over the first radio channel to the UEs, in response to receiving the second data;

receiving, from the first base station device, third data that is to be sent towards the UEs on a second radio channel of a first licensed frequency band;

receiving, from the second base station device, fourth data that is to be sent towards the UEs on a third radio channel of a second licensed frequency band;

sending, in response to receiving the third data, the third data towards the UEs for transmission on the second radio channel of the first licensed frequency band which is different from the first radio channel; and sending, in response to receiving the fourth data, the fourth data towards the UEs for transmission on the third radio channel of the second licensed frequency band which is different from the first radio channel and the second radio channel.

2. The method according to claim 1, wherein the sending of the first indication that the first radio channel is free is triggered by a reception of an indication from the first remote radio device that the first radio channel is free.

3. The method according to claim 1, wherein the sending of the first indication that the first radio channel is free is triggered by a detection that the first data is no longer sent on the point-to-point connection.

4. The method according to claim 1, further comprising:
receiving a second indication from the first remote radio device that the second data was not sent from the first remote radio device towards the UEs; and
sending the received second indication to the second base station device.

5. The method according to claim 1, wherein the third data and the fourth data are sent over the point-to-point connection to the first remote radio device for transmission to the UEs.

6. The method according to claim 1, further comprising:
sending the third data over a second point-to-point connection towards a second remote radio device connected to the second point-to-point connection for transmission to the UEs; and
sending the fourth data over a third point-to-point connection towards a third remote radio device connected to the third point-to-point connection for transmission to the UEs.

7. The method according to claim 1, further comprising:
sending a further indication to the second base station device that the point-to-point connection is occupied, in response to the receiving of the first data from the first base station device.

8. A method performed by a remote radio device of a distributed base station system of a wireless communication network, for downlink transmission, the base station system comprising a first base station device and a second base station device, each base station device being connected to an intermediate device of the distributed base station system, the intermediate device being connected via a point-to-point connection to the remote radio device, and the remote radio device is connected to at least one antenna for distributing wireless signals to a plurality of User Equipment (UEs), the method comprising:

receiving, at a first time point, from the intermediate device over the point-to-point connection, first data originating from the first base station device, wherein the first data is to be sent towards the UEs on a first radio channel of an unlicensed frequency band;

sending the first data over the first radio channel to the UEs;

receiving, at a second time point which is separate from the first time point, from the intermediate device over the point-to-point connection, second data originating from the second base station device, wherein the second data is to be sent towards the UEs on the first radio channel of the unlicensed frequency band and wherein the second data was sent from the second base station after the intermediate device, subsequent to receiving the first data, sent a first indication to the second base station that the first radio channel was free;

sending the second data over the first radio channel to the UEs;

receiving, from the intermediate device over the point-to-point connection, third data originating from the first base station device that is to be sent towards the UEs on a second radio channel of a first licensed frequency band;

receiving, from the intermediate device over the point-to-point connection, fourth data originating from the second base station device that is to be sent towards the UEs on a third radio channel of a second licensed frequency band;

transmitting the third data towards the UEs on the second radio channel of the first licensed frequency band which is different from the first radio channel; and transmitting the fourth data towards the UEs on the third radio channel of the second licensed frequency band which is different from the first radio channel and the second radio channel.

9. The method according to claim 8, further comprising:
detecting that the first radio channel is free; and
sending, to the intermediate device, a second indication that the first radio channel is free, in response to the detection that the first radio channel is free.

10. The method according to claim 8, further comprising:
detecting that the first radio channel is occupied when trying to send the second data to the UEs; and sending a second indication to the intermediate device that the second data was not sent from the remote radio device towards the UEs.

11. An intermediate device operable in a distributed base station system of a wireless communication network, the distributed base station system comprising a first base station device and a second base station device, each base station device being connected to the intermediate device, the intermediate device being further connected via a point-to-point connection to a first remote radio device of the distributed base station system, which first remote radio device is connected to at least one antenna for distributing wireless signals to a plurality of User Equipment (UEs), the intermediate device comprising:
a processor; and
a memory containing instructions which, when executed by said processor, instructs the intermediate device to perform operations to:
receive, from the first base station device, first data that is to be sent from the first remote radio device towards the UEs on a first radio channel of an unlicensed frequency band;
send, at a first time point, the first data over the point-to-point connection to the first remote radio device for further distribution wirelessly over the first radio channel to the UEs, in response to the reception of the first data;
send, to the second base station device, a first indication that the first radio channel is free;
receive, from the second base station device, second data that is to be sent from the first remote radio device towards the UEs on the first radio channel of the unlicensed frequency band, the second data being received in response to sending of the first indication;
send, at a second time point which is separate from the first time point, the second data over the point-to-point connection to the first remote radio device for further distribution wirelessly over the first radio channel to the UEs, in response to the reception of the second data;
receive, from the first base station device, third data that is to be sent towards the UEs on a second radio channel of a first licensed frequency band;
receive, from the second base station device, fourth data that is to be sent towards the UEs on a third radio channel of a second licensed frequency band;
send, in response to receiving the third data, the third data towards the UEs for transmission on the second radio channel of the first licensed frequency band which is different from the first radio channel; and
send, in response to receiving the fourth data, the fourth data towards the UEs for transmission on the third radio channel of the second licensed frequency band which is different from the first radio channel and the second radio channel.

12. The intermediate device according to claim 11, being operative to trigger to send the first indication that the first radio channel is free is by a reception of an indication from the first remote radio device that the first radio channel is free.

13. The intermediate device according to claim 11, being operative to trigger to send the first indication that the first radio channel is free by a detection that the first data is no longer sent on the point-to-point connection.

14. The intermediate device according to claim 11, wherein the instructions further instruct the intermediate device to perform operations to:
receive a second indication from the first remote radio device that the second data was not sent from the first remote radio device towards the UEs; and
send the received second indication to the second base station device.

15. The intermediate device according to claim 11, wherein the instructions further instruct the intermediate device to perform operations to send the third data and the fourth data over the point-to-point connection to the first remote radio device for transmission to the UEs.

16. The intermediate device according to claim 11, wherein the instructions further instruct the intermediate device to perform operations to:
send the third data over a second point-to-point connection towards a second remote radio device connected to the second point-to-point connection for transmission to the UEs; and
send the fourth data over a third point-to-point connection towards a third remote radio device connected to the third point-to-point connection for transmission to the UEs.

17. The intermediate device according to claim 11, wherein the instructions further instruct the intermediate device to perform operations to send a further indication to the second base station device that the point-to-point connection is occupied, in response to the reception of the first data from the first base station device.

18. A non-transitory computer readable storage medium containing computer readable code to be run in an intermediate device of a distributed base station system, the distributed base station system comprising a first base station device and a second base station device, each base station device being connected to the intermediate device, the intermediate device being further connected via a point-to-point connection to a first remote radio device of the distributed base station system, which first remote radio device is connected to at least one antenna for distributing wireless signals to a plurality of User Equipment (UEs), wherein the computer readable code which, when executed on a processor of the intermediate device, causes the intermediate device to perform operations comprising:
receiving, from the first base station device, first data that is to be sent from the first remote radio device towards the UEs on a first radio channel of an unlicensed frequency band;
sending, at a first time point, the first data over the point-to-point connection to the first remote radio device for further distribution wirelessly over the first radio channel to the UEs, in response to receiving the first data;
sending, to the second base station device, a first indication that the first radio channel is free;
receiving, from the second base station device, second data that is to be sent from the first remote radio device towards the UEs on the first radio channel of the unlicensed frequency band, the second data being received in response to the sending of the first indication;
sending, at a second time point which is separate from the first time point, the second data over the point-to-point connection to the first remote radio device for further distribution wirelessly over the first radio channel to the UEs, in response to receiving the second data;

receiving, from the first base station device, third data that is to be sent towards the UEs on a second radio channel of a first licensed frequency band;

receiving, from the second base station device, fourth data that is to be sent towards the UEs on a third radio channel of a second licensed frequency band;

sending, in response to receiving the third data, the third data towards the UEs for transmission on the second radio channel of the first licensed frequency band which is different from the first radio channel; and sending, in response to receiving the fourth data, the fourth data towards the UEs for transmission on the third radio channel of the second licensed frequency band which is different from the first radio channel and the second radio channel.

19. A remote radio device operable in a distributed base station system of a wireless communication network, for efficient downlink transmission, the base station system comprising a first base station device and a second base station device, each base station device being connected to an intermediate device of the distributed base station system, the intermediate device being connected via a point-to-point connection to the remote radio device, and the remote radio device is connected to a at least one antenna for distributing wireless signals to a plurality of User Equipment (UEs), the remote radio device comprising:

a processor; and a memory containing instructions which, when executed by said processor, instructs the remote radio device to perform operations to:

receive, at a first time point, from the intermediate device over the point-to-point connection, first data originating from the first base station device wherein the first data is to be sent towards the UEs on a first radio channel of an unlicensed frequency band;

send the first data over a first radio channel to the UEs;

receive, at a second time point which is separate from the first time point, from the intermediate device over the point-to-point connection, a second data originating from the second base station device, wherein the second data is to be sent towards the UEs on the first radio channel of the unlicensed frequency band and wherein the second data was sent from the second base station after the intermediate device, subsequent to receiving the first data, sent a first indication to the second base station that the first radio channel was free;

send the second data over the first radio channel to the UEs;

receive, from the intermediate device over the point-to-point connection, third data originating from the first base station device that is to be sent towards the UEs on a second radio channel of a first licensed frequency band;

receive, from the intermediate device over the point-to-point connection, fourth data originating from the second base station device that is to be sent towards the UEs on a third radio channel of a second licensed frequency band;

transmit the third data towards the UEs on the second radio channel of the first licensed frequency band which is different from the first radio channel; and transmit the fourth data towards the UEs on the third radio channel of the second licensed frequency band which is different from the first radio channel and the second radio channel.

20. The remote radio device according to claim 19, further being operative to:

detect that the first radio channel is free; and send, to the intermediate device, a second indication that the first radio channel is free, in response to a detection that the first radio channel is free.

21. A non-transitory computer readable storage medium containing computer readable code to be run in a remote radio device of a distributed base station system, the distributed base station system comprising a first base station device and a second base station device, each base station device being connected to an intermediate device of the distributed base station system, the intermediate device being connected via a wireline connection or a wireless point-to-point connection to the remote radio device, and the remote radio device is connected to at least one antenna for distributing wireless signals to pieces of User Equipment (UEs), wherein the computer readable code which, when executed on a processor of the remote radio device causes the remote radio device to perform operations comprising:

receiving, at a first time point, from the intermediate device over the point-to-point connection, first data originating from the first base station device, wherein the first data is to be sent towards the UEs on a first radio channel of an unlicensed frequency band;

sending the first data over a first radio channel to the UEs;

receiving, at a second time point which is separate from the first time point, from the intermediate device over the point-to-point connection, second data originating from the second base station device, wherein the second data is to be sent towards the UEs on the first radio channel of the unlicensed frequency band and wherein the second data was sent from the second base station after the intermediate device, subsequent to receiving the first data, sent an indication to the second base station that the first radio channel was free; and sending the second data over the first radio channel to the UEs;

receiving, from the intermediate device over the point-to-point connection, third data originating from the first base station device that is to be sent towards the UEs on a second radio channel of a first licensed frequency band;

receiving, from the intermediate device over the point-to-point connection, fourth data originating from the second base station device that is to be sent towards the UEs on a third radio channel of a second licensed frequency band;

transmitting the third data towards the UEs on the second radio channel of the first licensed frequency band which is different from the first radio channel; and transmitting the fourth data towards the UEs on the third radio channel of the second licensed frequency band which is different from the first radio channel and the second radio channel.

* * * * *